March 28, 1933. T. LAURENT 1,903,054
LOADING COIL BOX
Filed April 24, 1931
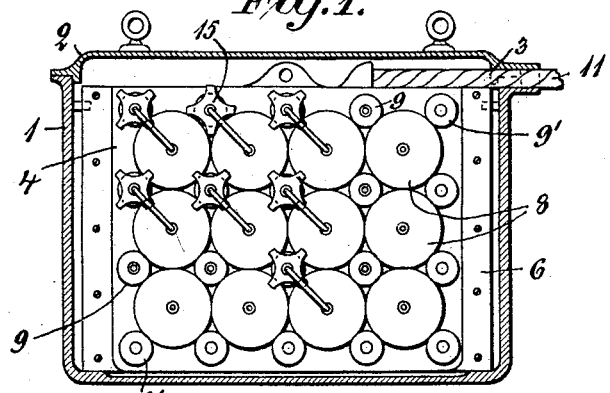
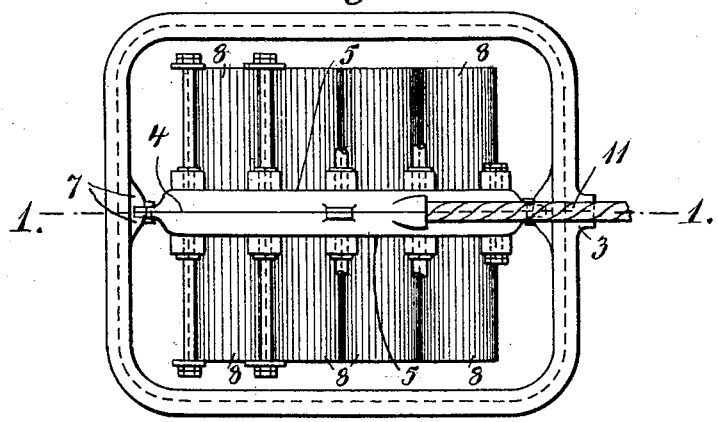
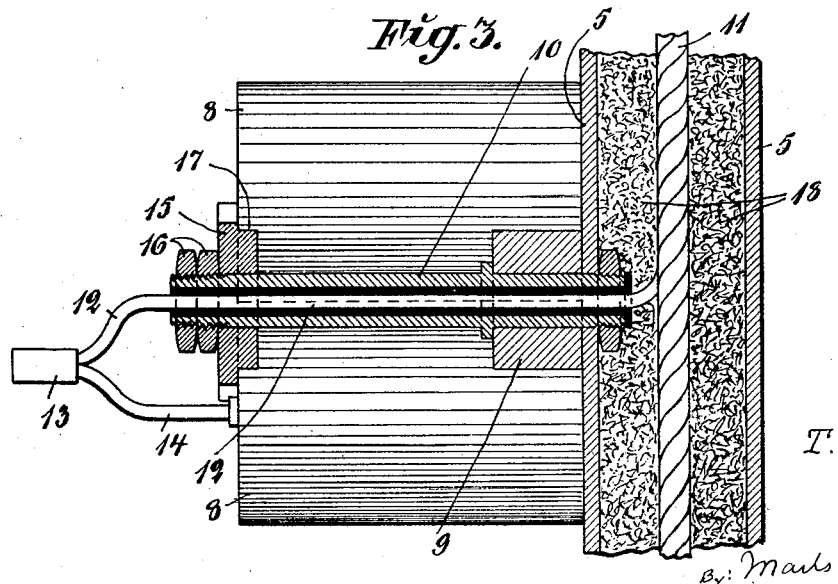
T. Laurent
INVENTOR Patented Mar. 28, 1933

1,903,054

UNITED STATES PATENT OFFICE

TORBERN LAURENT, OF STOCKHOLM, SWEDEN, ASSIGNOR TO TELEFONAKTIEBOLAGET
L. M. ERICSSON, OF STOCKHOLM, SWEDEN, A COMPANY OF SWEDEN

LOADING COIL BOX

Application filed April 24, 1931, Serial No. 532,682, and in Sweden May 5, 1930.

The present invention refers to loading coil boxes, and more particularly to loading coil boxes for telephone cables.

In loading coil boxes as hitherto used the coils are either embedded in insulating compound filling the whole box, or each individual coil, or each group of coils, is enclosed in a protective casing or the like and the casings placed in the box without subsequently pouring any insulating compound into the same. Both these methods of arranging the loading coils in a box are attended by certain inconveniences. In loading coil boxes of the first mentioned kind, i. e. loading coil boxes having loading coils submerged in insulating compound, the coils and the connecting leads are well protected against moisture, but replacement of coils, by way of example for the purpose of altering the loading, is attended by great difficulties and expenses. In such loading coil boxes, on the other hand, where the connections and the junction leads between the coils and the cable are protected against moisture and the like only by the box proper the coils or groups of coils are easily exchangeable, it is true, but the junction leads and the connections between the coils and the cable are easily damaged by moisture penetrating into the box, such damage easily giving rise to traffic disturbances.

The present invention has for its object to construct a loading coil box in which the loading coils are easily replaceable while at the same time an effective protection is obtained for the junction leads and the connections between the loading coils and the cable or cables respectively. According to the invention each of the different groups of loading coils is provided with an individual protective covering, each of said groups being, by way of example, disposed in a cylindrical casing filled with insulating compound, and said casings are on the outside detachably secured to a plane end wall of a cable distribution box, preferably filled with insulating compound, or detachably fixed in some other manner and connected to the cable distribution box by means of leads brought out from said cable distribution box.

The invention will be more closely described with reference to the accompanying drawing. Figure 1 shows a section of the loading coil box. Figure 2 shows a top view of the loading coil box with the cover removed. Figure 3 is a detail illustrating the manner of securing the loading coil protective casings and of arranging the connections between the loading coil casings and the cable distribution box.

The loading coil box proper consists of a protective case 1 with appertaining removable cover 2 and of a leading-in aperture 3 for the cable. The cable distribution box 4 which is made in the shape of a flat box having plane end walls 5 is disposed centrally of the box and in a vertical position. The distribution box consists of two halves which are secured together by means of screws inserted in vertical flanges 6. The distribution box is held in position by guide lips 7, two and two of which are adapted to embrace the vertical flanges 6.

The flat end walls of the cable distribution box serve as supports for the cylindrical loading coil casings 8 which the secured to the end walls with their bottoms bearing against said walls. Each one of the loading coil casings 8 is assumed to contain three loading coils, namely one coil for each of two duplexed lines and one for the phantom line formed by said duplexed lines. The loading coil casings are at the bottom disposed between cylindrical supports 9 and 9′ respectively bearing against said casings and secured to the end walls and arranged between and about the loading coil casings evenly distributed over the end walls of the cable distribution box.

Some of the cylindrical supports 9 are passed by leading-in tubes 10, each of said tubes enclosing a lead sheathed cable 12 branched off the main cable 11 and comprising two outgoing and two returning lines.

Outside the leading-in tubes each of the cables 12 is connected to a junction cable 14 by means of cable splices 13 protected by a lead sleeve, said junction cable entering at the center of one of the adjacent loading coil casings and being internally connected to the coils in the casing. The leading-in tubes 10 have a double object, said tubes also serving as supports for the loading coil casings. For this purpose the leading-in tubes 10 are at their ends provided with a revolving cross 15 having four arms and held in position on the tube by means of threaded on nuts 16, the arms of said cross in the holding position engaging the outer bottoms of the adjacent loading coil casings 8 keeping said casings firmly pressed against the flat end wall of the cable distribution box. Each of the crosses 15 is at its lower side formed with an annular supporting plate 17 bearing against the surrounding loading coil casings and forming a further lateral support for the same.

As the cable connections are well protected in the cable distribution box 4 filled with insulating compound 18 and the parts of the cable extending outside of the casings are lead covered and connected together two and two by means of air tight splices there are no points whatever where moisture, that may have entered the box, may attack. All free surfaces, such as the inner walls of the box, the loading coil casings, the connecting leads, etc. are preferably coated with bitumen or the like for the purpose of preventing the occurrence of injurious electrolytic currents.

As will be understood from the above the cable distribution box together with the loading coil casings secured to the end walls of the same form a unit which may be lifted out of the protective case 1 for repairs and exchange of parts. If it is desired to inspect or replace one or more of the loading coil casings the appertaining outer joints 13 are opened, each one of the fixing crosses 15 is turned 45 degrees in the one direction or the other, whereby said arms are disengaged from the surrounding loading coil casings, whereupon the casings may be taken out. The placing in position of new coil casings is carried out in a corresponding manner and said casings connected to the appertaining cables 12. Repairs and inspection may thus be carried out in a very convenient and labour saving manner while maintaining a fully effective protection against moisture.

The above described arrangement of the loading coils in a loading coil box may be modified in several different ways. It is thus conceivable to have the cable distribution box 4 formed by inserting, in a special manner, a partition wall in the loading coil box, on the one side of which partition wall the connections between the cable and the loading coils are disposed totally embedded in insulating compound and on the other side of which wall the loading coils are arranged, either individually or in groups surrounded by a protective cover casing.

I claim:—

1. A loading coil arrangement comprising in combination, a distribution box formed on the outside with a supporting plate, a plurality of loading coils divided into groups, a plurality of cylindrical protecting coverings enclosing each one of said groups of coils and bearing with their flat bases against the plane supporting plate of said box, means for detachably securing the cylindrical coverings to the box, and external sheathed junction cables extending through said supporting plate and connecting the groups of coils individually with the distribution box.

2. A loading coil arrangement comprising in combination a distribution box formed on the outside with a supporting plate, a plurality of loading coils divided into groups, a number of cylindrical protecting coverings enclosing each one of said groups of coils and bearing with their flat bases against the plane supporting plate of the distribution box, a plurality of leading-in tubes projecting from said supporting surfaces, sheathed connecting cables branched off from the distribution box through said tubes, and means associated with said tubes for detachably securing said coverings to the distribution box.

3. An arrangement as claimed in claim 2, characterized in that the securing means consists of members which are rotatably disposed on the outer ends of the leading-in tubes, said members being adapted to be turned into and out of operative position in engagement with one or more cylindrical loading coil casings and to hold in such operative position said casings with their bottom surfaces firmly pressed against the outside of the cable distribution box.

4. An arrangement as claimed in claim 1, characterized in that all free surfaces, such as walls, loading coil casings, junction leads etc. are coated with bitumen or the like for the purpose of preventing the occurrence of destructive electrolytic currents between parts of different metals.

In testimony whereof I affix my signature.

TORBERN LAURENT.